(No Model.)
N. H. DAVIS.
CAR SPRING.
No. 364,162.  Patented May 31, 1887.
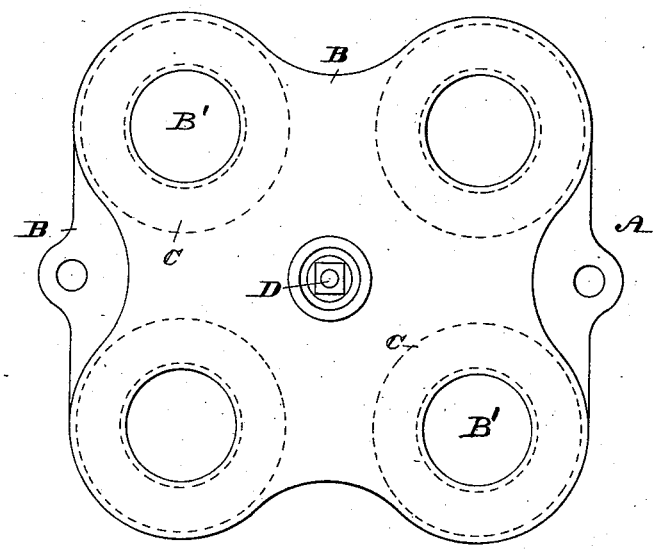
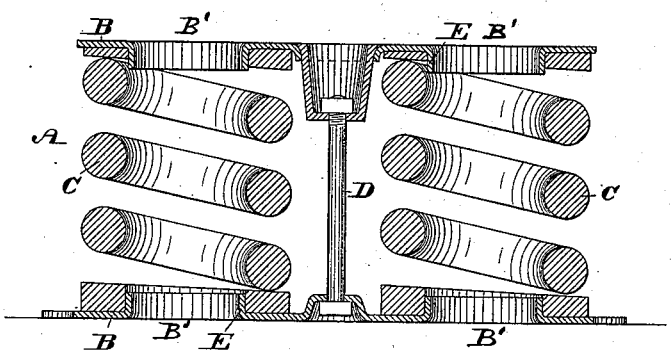
WITNESSES:
Th. Rollé.
Jas. P. Kelly.
INVENTOR:
Nathan H. Davis
BY John A. Wiedersheim
ATTORNEY.

UNITED STATES PATENT OFFICE.

NATHAN H. DAVIS, OF PHILADELPHIA, PENNSYLVANIA, ASSIGNOR OF ONE-HALF TO LEWIS C. GRATZ, OF SAME PLACE.

CAR-SPRING.

SPECIFICATION forming part of Letters Patent No. 364,162, dated May 31, 1887.

Application filed February 24, 1887. Serial No. 228,707. (No model.)

*To all whom it may concern:*

Be it known that I, NATHAN H. DAVIS, a citizen of the United States, residing in the city and county of Philadelphia, State of Pennsylvania, have invented a new and useful Improvement in Springs, which improvement is fully set forth in the following specification and accompanying drawings, in which—

Figure 1 represents a top or plan view of a car-spring embodying my invention. Fig. 2 represents a central vertical section thereof.

Similar letters of reference indicate corresponding parts in the two figures.

My invention consists of a car-spring having spring-plates formed of wrought metal, with flanges integral therewith formed around openings in said plates, whereby a strong, durable, inexpensive, and comparatively light spring is produced, as will be hereinafter set forth.

Referring to the drawings, A represents a spring, which consists of the upper and lower spring-plates, B, the coiled springs C, and the bolt D, the latter having its head engaging with one plate and its opposite end provided with a nut which engages with a socket in the other plate, the plates thus being connected by the bolt and retaining the springs between them.

In the plates B are openings B', the walls of which are flanged, as at E, the flanges projecting inwardly and being formed by squeezing, punching, pressing, and otherwise working the metal around said openings, so as to produce the flanges as integral portions of the wrought-metal plates. It will be seen that the flanges E enter the ends of the springs C and act as guides, preventing lateral displacement of said springs, said flanges also serving to reenforce the walls of the openings, and consequently strengthen the plates; and as said plates are made of wrought metal it will be seen that the car-spring is strong, durable, and of reduced weight, and may be quickly produced.

I am aware that spring-plates have been made of malleable iron, but the same are liable to be cracked, fractured, or broken. They do not possess the necessary strength for the purpose intended, and require considerable time in their manufacture, usual in articles of malleable iron. I do not claim such spring-plates.

I am also aware that it is not new to form spring-plates of wrought metal with depressed surfaces; but in my invention the spring-plates are primarily punched to form the openings B', and the walls of said openings are then subjected to a drawing operation, forming the flanges E, whereby said walls, and consequently the corners of the plates, are greatly stiffened without adding to the weight of the plates. On the contrary, the plates are of reduced weight, owing to the openings B' and the thin metal which may be used. The features of the coiled springs and fastening devices are embodied in another application for Letters Patent, Serial No. 228,708, filed by me on the 24th day of February, 1887.

Having fully described my invention, what I do claim as new, and desire to secure by Letters Patent, is—

A car-spring plate formed of wrought metal, with openings and flanges around said openings, substantially as and for the purpose set forth.

NATHAN H. DAVIS.

Witnesses:
JOHN A. WIEDERSHEIM,
L. DOUVILLE.